United States Patent
Yamamoto

(10) Patent No.: US 9,542,398 B2
(45) Date of Patent: Jan. 10, 2017

(54) ELECTRONIC APPARATUS

(71) Applicant: Kabushiki Kaisha Toshiba, Tokyo (JP)

(72) Inventor: Takanori Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 14/458,024

(22) Filed: Aug. 12, 2014

(65) Prior Publication Data

US 2015/0169560 A1    Jun. 18, 2015

Related U.S. Application Data

(60) Provisional application No. 61/917,772, filed on Dec. 18, 2013.

(51) Int. Cl.
*G06F 17/30*    (2006.01)
*G06F 7/00*    (2006.01)

(52) U.S. Cl.
CPC .................. *G06F 17/3007* (2013.01)

(58) Field of Classification Search
USPC ......................................... 707/609
See application file for complete search history.

(56) References Cited

U.S. PATENT DOCUMENTS

| | | | |
|---|---|---|---|
| 6,310,617 B1 | 10/2001 | Nunokawa et al. | |
| 7,107,527 B2 * | 9/2006 | Takahashi | G06F 17/30011 707/E17.005 |
| 2015/0324414 A1 * | 11/2015 | Noguchi | G06F 17/30368 707/690 |

FOREIGN PATENT DOCUMENTS

| | | |
|---|---|---|
| JP | 10-239073 | 9/1998 |
| JP | 2003-122334 | 4/2003 |
| JP | 2004-178353 | 6/2004 |
| JP | 2013-128310 | 6/2013 |

* cited by examiner

*Primary Examiner* — Kuen Lu
(74) *Attorney, Agent, or Firm* — Rutan & Tucker, LLP

(57) ABSTRACT

According to one embodiment, an information processing device reads a management file in a storage device. The information processing device analyzes information necessary for management and stores the analysis result. The information processing device performs specified processing based on the analysis result stored by the analysis processor. The information processing device obtains update information of the management file of each content item accumulated in the storage device and determines whether the update information has been changed or not. The information processing device performs the specified processing using the analysis result previously stored by the analysis processor if the update information has not been changed.

9 Claims, 6 Drawing Sheets

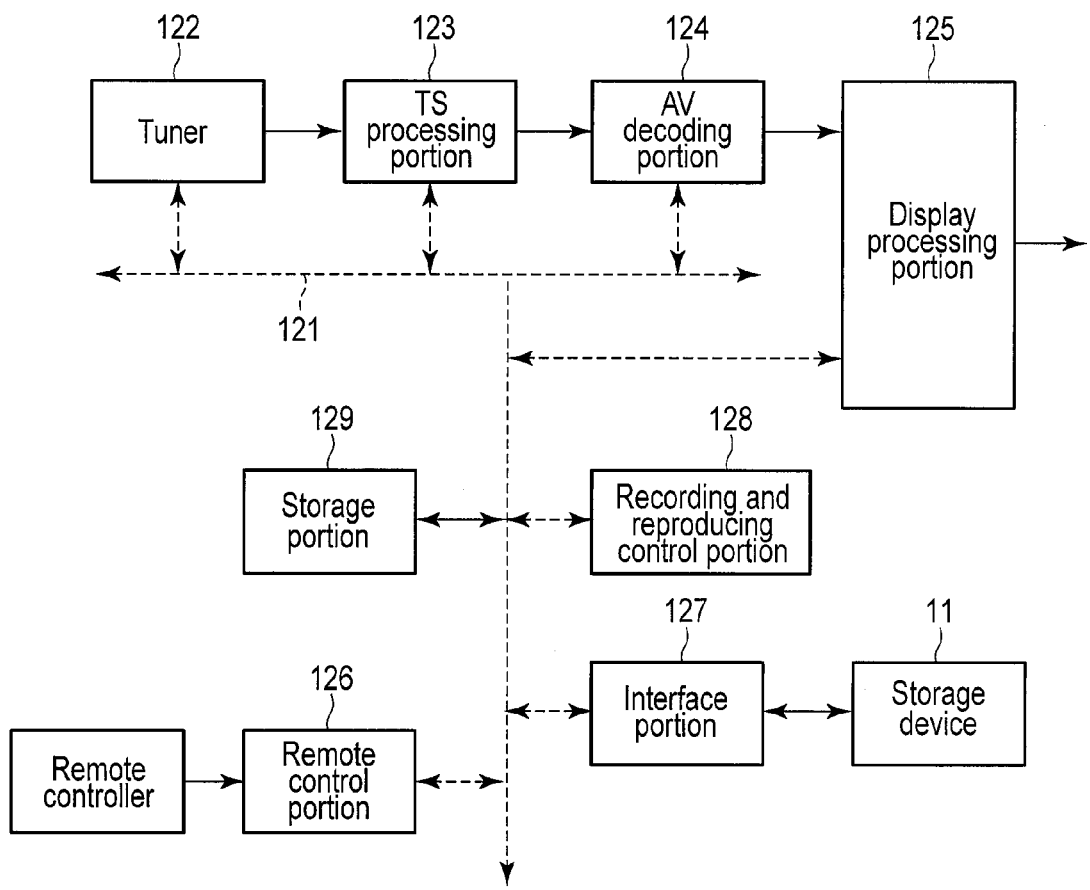
F I G. 2

ELECTRONIC APPARATUS

CROSS-REFERENCE TO RELATED APPLICATIONS

This application claims the benefit of U.S. Provisional Application No. 61/917,772, filed Dec. 18, 2013, the entire contents of which are incorporated herein by reference.

FIELD

Embodiments described herein relate generally to an information processing device for reproducing content read from a storage device, an information processing method, and a storage medium for an information processing program.

BACKGROUND

Regarding content such as high-definition (HD) which is accumulated in a storage device, the standard called SeeQVault is a digital right management (DRM) technique for protecting a copyright. Storage devices such as Secure Digital (SD) cards and Universal Serial Bus hard disk drives (USB-HDDs) conform to the SeeQVault standard. Content recorded in a storage device conforming to the SeeQVault standard can be reproduced by an information processing device having a decoding function conforming to the SeeQVault standard.

The content recorded in a storage device ready to DRM such as SeeQVault comprises a management file in which information necessary for management is stored separately from a data file. Information such as the number of content items in the storage device, titles, recorded times and resume information (what content was last reproduced and to which part it was last reproduced) is stored in the management file. In the information processing device, if an instruction to list and display content in the storage device in the order of titles or recorded times is received, necessary information is obtained from the management file to generate list information sorted in the order of titles or recorded times, and a content list is displayed on a screen based on the list information.

Incidentally, in the information processing device in which the DRM technique is adopted, the more the number of content items stored in the storage device increases, the more time is required to analyze the management file and to generate the list information and the slower the content list is displayed. Then, a problem that the content list display is desired to be speeded up is caused. It should be noted that the speeding up of the content list display means reducing the interval between the time the content list display is requested by, for example, user's instruction input, etc., and the time the content list is displayed on a screen.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram illustrating a configuration example of a video display used in the system shown in FIG. 1.

DETAILED DESCRIPTION

Various embodiments will be described hereinafter with reference to the accompanying drawings.

In general, according to one embodiment, an information processing device which stores a data file of content and a management file in which information necessary for management is stored separately from the data file of the content when the content is stored, to which a storage device for updating the management file every time the content is accessed is connected, and which reads and reproduces any content from a plurality of content items recorded in the storage device is provided.

The information processing device comprises an analysis processor configured to read the management file in the storage device, to analyze the information necessary for management, and to store analysis result.

The information processing device comprises a controller configured to perform specified processing based on the analysis result stored by the analysis processor.

The information processing device comprises an update information obtaining portion configured to obtain update information of the management file of each content item accumulated in the storage device.

The information processing device comprises a determination portion configured to determine whether the update information has been changed or not.

The controller performs the specified processing using the analysis result to be newly obtained in the analysis processor if the update information has been changed, and performs the specified processing using the analysis result previously stored by the analysis processor if the update information has not been changed.

Figure 1:
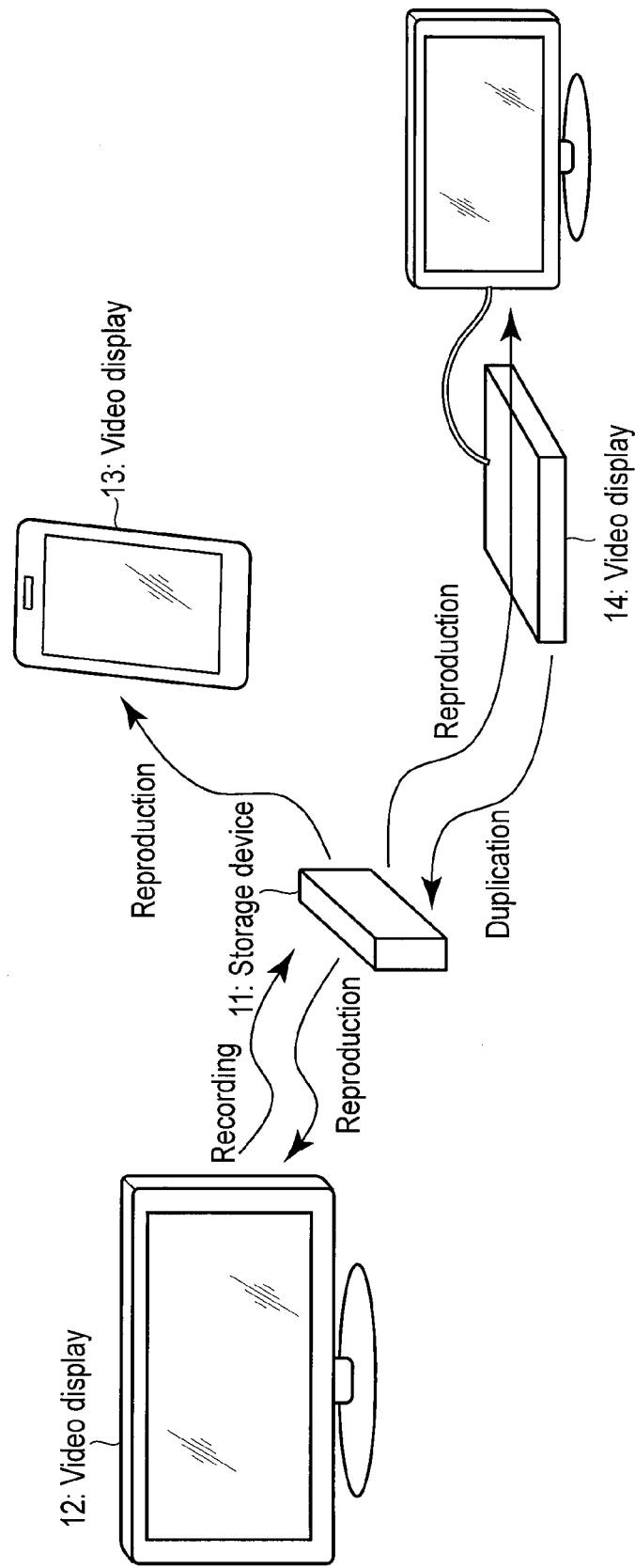
FIG. 1 is a schematic view roughly illustrating a structure of an information processing system according to an embodiment.

FIG. 1 illustrates, as an information processing system according to an embodiment, an example of an environment in which a plurality of DRM-ready video displays 12 to 14 are accessible to a storage device 11 ready to DRM such as SeeQVault. For example, the video display 12 is an television apparatus which can record and reproduce video content by accessing the storage device 11, the video display 13 is a tablet computer configured to selectively reproduce content provided from the storage device 11, and the video display 14 is a recording and reproducing apparatus configured to duplicate content or to perform monitor reproduction with the storage device 11.

The storage device 11 is a removable medium such as a USB-HDD and an SD card. For example, after the video display 12 records HD content of a broadcast program in the storage device 11, the storage device 11 is removed from the video display 12 to connect the video display 13 and the content recorded by the video display 12 can be reproduced by the video display 13. This embodiment is directed to an environment in which the same storage device 11 is connected to a plurality of video displays in turn in this manner.

The video display 12 is formed as shown in FIG. 2. In FIG. 2, 121 denotes a control bus, and a tuner 122, a TS processing portion 123, an AV decoding portion 124, a display and reproduction processing portion 125, a remote control portion 126, an interface portion 127 and a recording and reproducing control portion 128 are connected to the control bus 121.

The tuner 122 receives a digital broadcast signal, and tunes and receives a broadcast TS of any channel. The TS processing portion 123 decodes program content from the broadcast TS obtained by the tuner 122. The AV decoding portion 124 decodes audio and video of the decoded program content. The display and reproduction processing portion 125 performs processing to display and reproduce a video audio signal obtained by the AV decoding portion 124 in a predetermined form.

A remote controller comprises an operation key, operated by a user, for causing a video display to perform any processing, and notifies the remote control portion 126 of its operation input using infrared rays. The remote control portion 126 receives an operation input signal from the remote controller, discriminates the operation, and performs specified processing.

The interface portion 127 is connected to the storage device 11, and transmits and receives video content to and from the storage device 11 in accordance with an instruction from the user. The recording and reproducing control portion 128 controls recording or reproduction of video content specified by the user with respect to the storage device 11 in accordance with the user's operation input. The recording and reproducing control portion 128 conforms to the DRM, and controls recording and reproduction of content based on the SeeQVault standard.

It should be noted that structures similar to that of the video display 12 are also provided in the other video displays 13 and 14 with respect to connection with the storage device 11 and a processing structure.

In the above structure, list display procedures of content stored in the storage device 11 will be described below, taking the video display 12 as an example.

Figure 3:
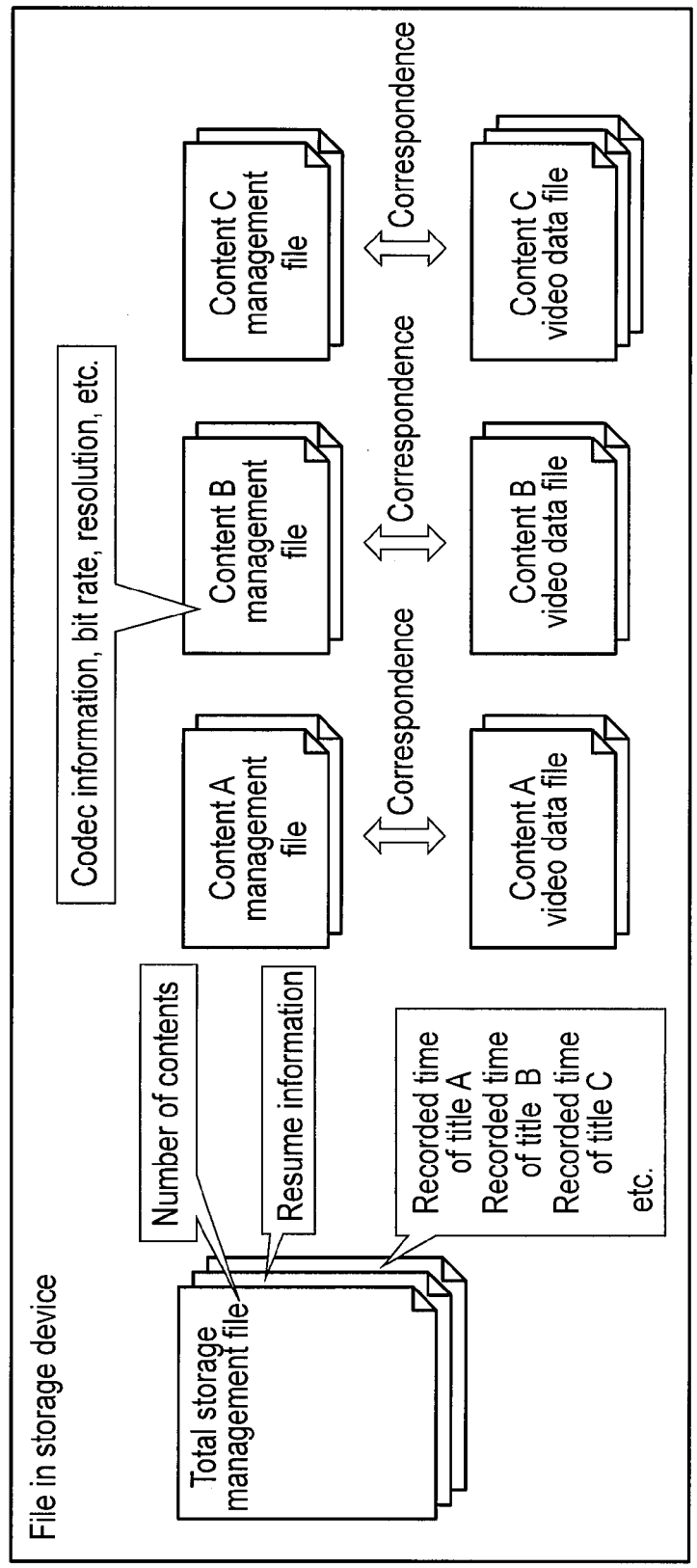
FIG. 3 illustrates a file configuration in a DRM-ready storage device shown in FIG. 1.

FIG. 3 illustrates a file configuration in the storage device 11 conforming to a DRM technique such as SeeQVault. The storage device 11 comprises not only a video data file of each content item but a management file in which information regarding each content item (codec information, a bit rate, a resolution, etc.) is arranged and a management file in which information regarding the total storage device such as the number of content items in the storage device 11, titles, recorded times and resume information is arranged. Although the storage device 11 is accessed by the plurality of the video displays 12 to 14, a file can be accessed between the video displays since the file configuration is determined by specifications. It should be noted that three content items are shown in FIG. 3 for simplification, but at least several hundred content items can be stored in the storage device 11 depending on the capacity of the storage device 11 and the size of an individual content item.

In the video display 12 to which the storage device 11 having the above structure is connected, if the content in the storage device 11 is listed and displayed in the order of titles or recorded times, the management file for each content item is read, analyzed and sorted in the order of titles or recorded times to generate content list information, and recorded content is listed and displayed on a screen based on the list information. In this case, the more the number of content items stored in the storage device 11 increases, the more time is required to analyze the management file and to generate the list information and the slower the content list is displayed. In this embodiment, the content list display is speeded up in the way to be described.

Figure 4:
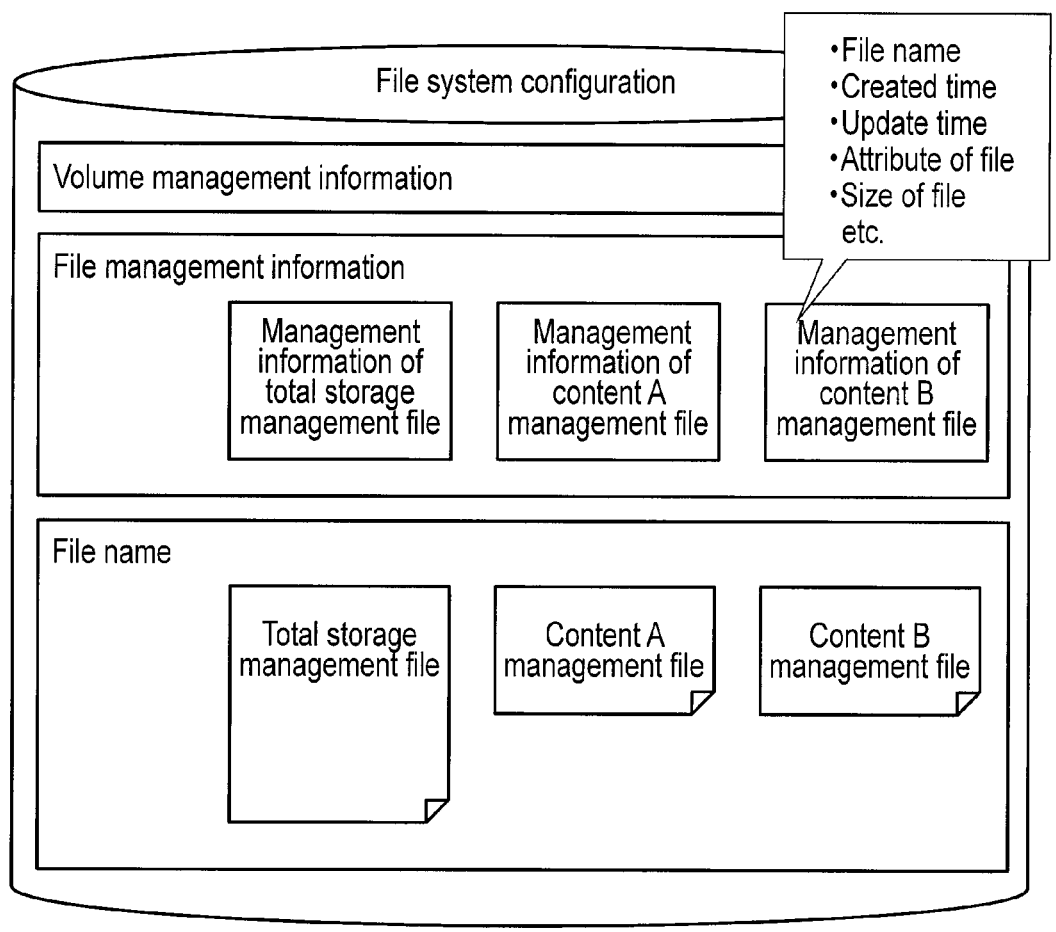
FIG. 4 illustrates a file system configuration of the DRM-ready storage device shown in FIG. 1.

FIG. 4 illustrates a general file system configuration in the storage device 11. The video data file in FIG. 3 is not described for simplification. In the general file system, management information of individual file data is stored in an area different from an area in which the substance of the file data is arranged. Information regarding the name, created time, update time, attributes, size, etc., of each file is stored in the management information. Thus, it is also possible to obtain only the management information of the file data without accessing the file data itself.

Then, in this embodiment, the management information of part of the management file (a file in which the total number of content items, and the titles and recorded times of all content items are arranged) which is always rewritten when reproduction, recording or duplication is performed in the video display 12 is obtained from the storage device 11, and whether the update time of the management information has been changed or not (whether the update time is different from a previously obtained update time or not) is confirmed. Then, the storage device 11 determines whether reproduction, recording or duplication has been performed in the other devices 13 and 14 or not. If it determines that the reproduction, recording or duplication has not been performed in the other device 13 or 14, the content list information previously generated and stored inside is reused. Similar processing is performed also in the other video displays 13 and 14.

Figure 5:
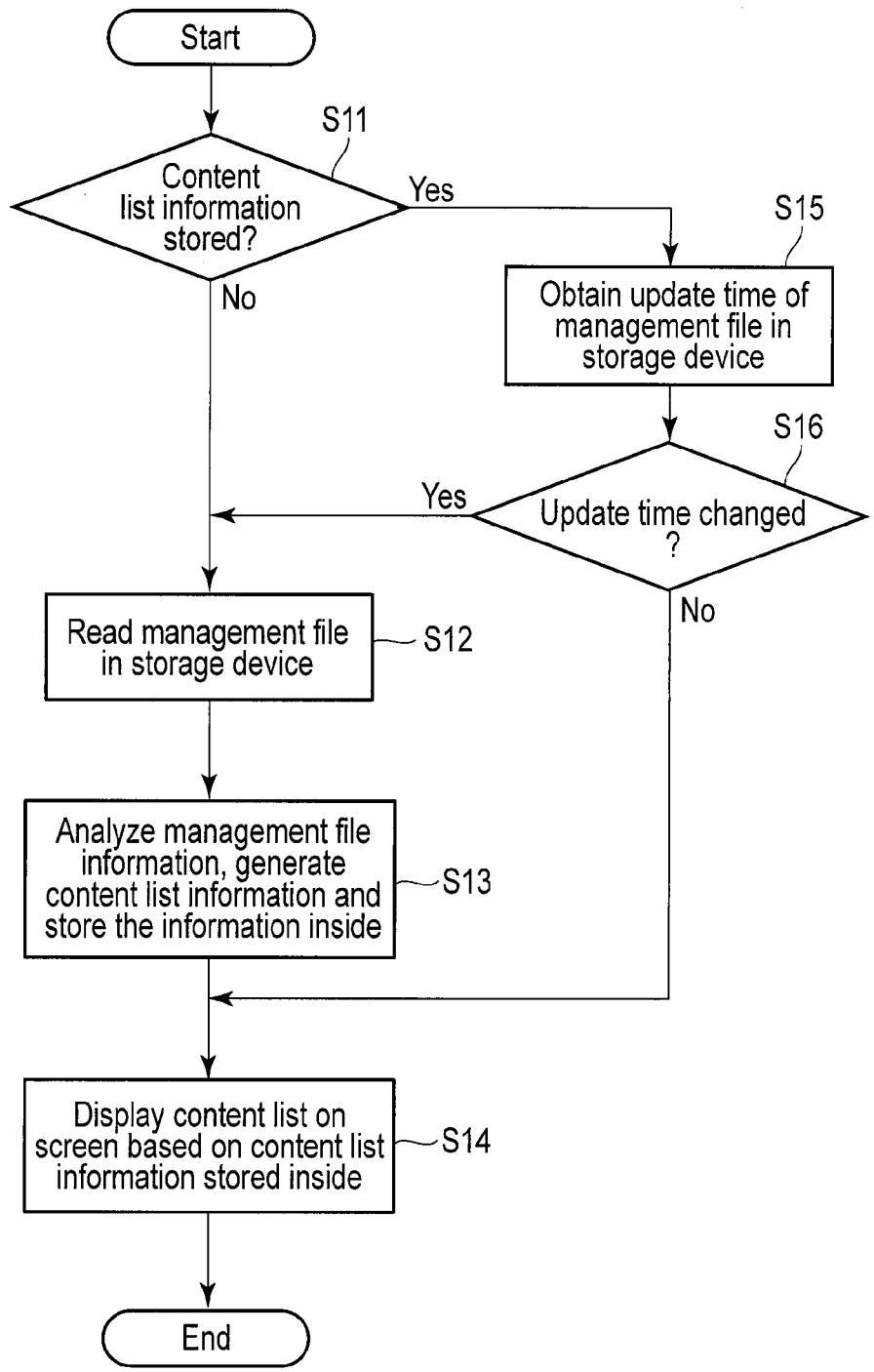
FIG. 5 is a flowchart illustrating procedures for displaying list information of content stored in a storage device in the video display shown in FIG. 2.

FIG. 5 briefly illustrates a processing flow from the time the content list display is requested to the video display 12 by user operation input, etc., until the time the content list is displayed on a screen. In the past, every time the display of the content list was requested, the management file in the storage device was read, its content was analyzed, content list information was generated from the analysis result and stored inside, and the content list was displayed based on the content list information stored inside.

On the other hand, in this embodiment, whether the content list information has already been stored or not is first determined, as shown in FIG. 5 (step S11). If it is determined that the content list information has not been stored (No), the management file in the storage device is read (step S12), the information of the management file is analyzed, and the content list information is generated and stored inside (step S13), and the content list is displayed on a screen based on the content list information stored inside (step S14). If it is determined in step S11 that the content list information has been stored (Yes), the update time of the management file in the storage device is obtained (step S15) and whether the update time has been changed or not is determined (step S16). If it is determined that the update time has been changed (Yes), the procedure shifts to step S12, and the processing proceeds after the management file in the storage device is read. If it is determined in step S16 that the update time has not been changed (No), the procedure directly shifts to step S14, and the display of the content list is started using the previously stored content list information.

As described above, if the processing method of this embodiment is used, the processing of reading the management file in the storage device 11 and that of analyzing the information of the management file and generating the content list information become unnecessary unless the storage device 11 performs the reproduction, recording or duplication in another device. Then, the time can be reduced by that amount.

It should be noted that in the above processing of FIG. 5, if the content list information is not stored (No in step S11) and if the update time has been changed (Yes in step S16), the video display 12 stores the content list information inside based on the read management file, and then displays the content list based on the content list information stored inside. In these cases, however, the video display 12 may display the content list based on the read management file before storing the content list information inside, and then store the content list information inside.

Regarding also resume reproduction, the processing can be omitted to reduce time in a similar manner. That is, in this embodiment, the management information of the management file in which the resume information is stored is obtained, and whether the update time has been changed or not is confirmed to determine whether the storage device 11 has been reproduced by another device or not. If it is determined that the storage device 11 has not been reproduced by another device, the reproduction is started from the point based on reproduction interruption portion information of content which was prestored inside and whose reproduction was interrupted previously in the video display.

Figure 6:
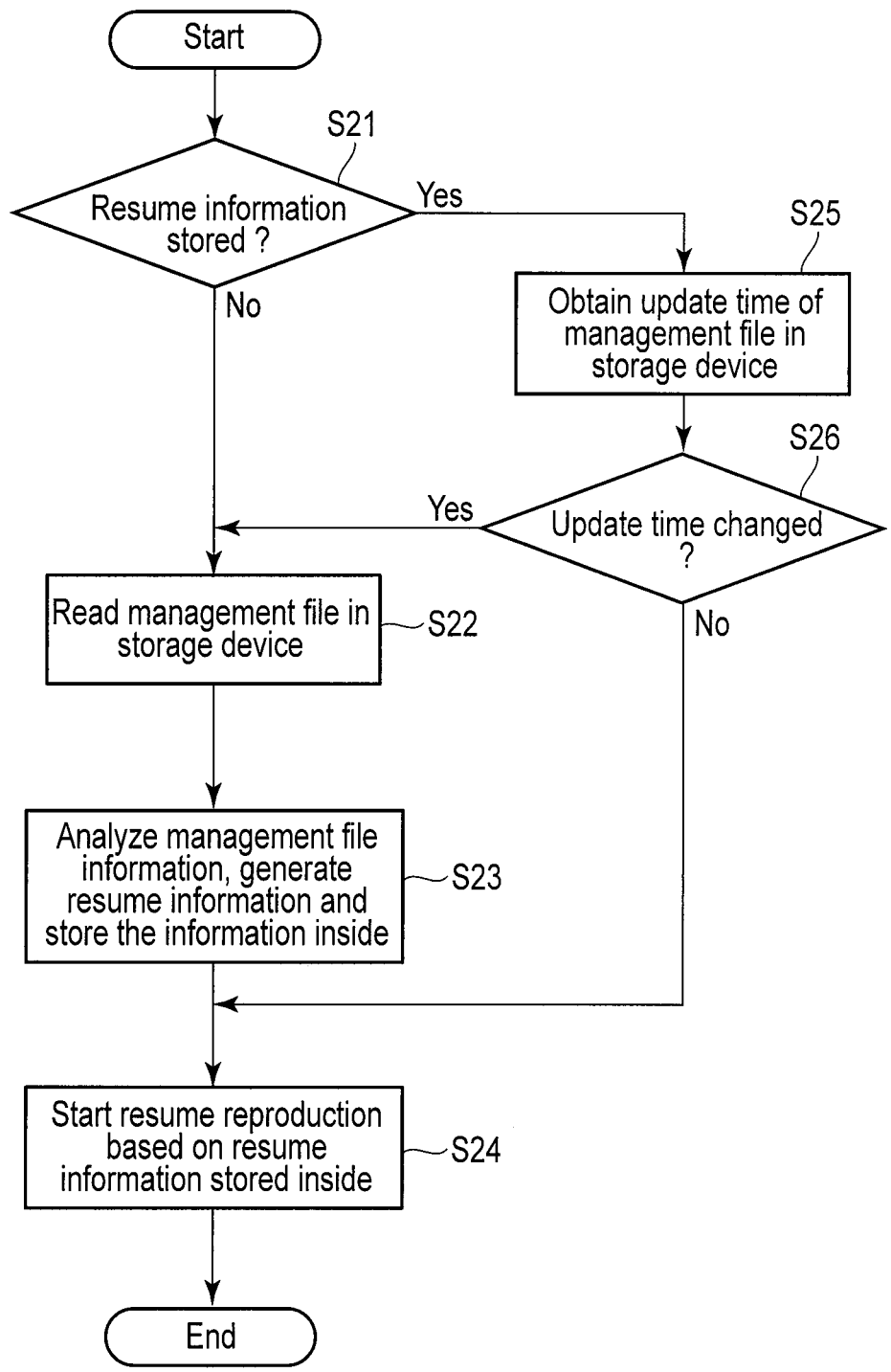
FIG. 6 is a flowchart illustrating procedures for performing resume reproduction on the content stored in the storage device in the video display shown in FIG. 2.

FIG. 6 briefly illustrates a processing flow from the time resume reproduction is requested to the video display 12 by user operation input, etc., until the time the resume reproduction is started on a screen. In the past, every time a resume reproduction instruction was input, the management file in the storage device 11 was read, the information of the management file was analyzed, resume content and a resume point were specified from the analysis result and stored inside as resume information, and the resume reproduction was started based on the resume information stored inside.

On the other hand, in this embodiment, it is first determined whether the resume information has already been stored or not (step S21), as shown in FIG. 6. If it is determined that the resume information has not been stored (No), the management file in the storage device is read (step S22), the information of the management file is analyzed and the resume content and the resume point are specified and stored inside as the resume information (step S23), and the reproduction of the resume is started based on the resume information stored inside (step S24). If it is determined in step S21 that the resume information has been stored (Yes), the update time of the management file in the storage device is obtained (step S25) and it is determined whether the update time has been changed or not (step S26). If it is determined that the update time has been changed (Yes), the procedure shifts to step S22, and the processing proceeds. If it is determined in step S26 that no update has been performed (No), the procedure directly shifts to step S24, and the resume reproduction is started using the previously stored resume information.

As described above, if the processing method of this embodiment is used, the processing of reading the management file in the storage device and that of analyzing the information of the management file and specifying the resume information become unnecessary unless the storage device 11 performs the reproduction in another device. Then, the time can be reduced by that amount.

It should be noted that if the resume information has not been stored in the processing of FIG. 6 (No in step S21) or if the update time has been changed (Yes in step S26), the video display 12 stores the resume information based on the read management file, and then the resume point is determined based on the resume information stored inside. In these cases, however, the video display 12 may specify the resume point based on the read management file before storing the resume information inside, and then store the resume information inside.

As described above, according to this embodiment, unless the storage device is removed from the video display, and the reproduction, recording or duplication is performed on the storage device in another device, not information of the management file in the storage device but that stored in the video display is used. Thus, the time for accessing the file data of the management file and that for analyzing processing can be reduced, and speeding up of the content list display and the resume reproduction can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a storage controller configured to read, from external storage, data files of content items and a management file of the content items, wherein the management file comprises information on attributes of the content items and an update timing, and the management file is updated every time one of the content items is played; and
   a hardware processor configured to:
   play a first content item from the content items in the external storage,
   update the management file at a first update timing in response to playing of the first content item,
   generate a first list of the content items according to the management file,
   store the first list and the first update timing in an internal memory,
   play the first content item in the external storage again,
   determine whether the update timing of the management file is the same as the first update timing,
   reuse the first list of the content items in the internal memory, when the update timing of the management file is the same as the first update timing, and
   generate a second list of the content items according to the management file, when the update timing of the management file is not the same as the first update timing.

2. The electronic apparatus of claim 1, wherein the update information of the management file indicates whether reproduction, recording or duplication of the content has been performed on the external storage or not.

3. The apparatus of claim 1 wherein the hardware processor is configured to:
   play a second content item in the external storage;
   stop the playing of the second content item;
   store a resume point of the second content item in the internal memory;
   update the management file at a second update timing in response to stopping of the play of the second content item;
   determine whether the update timing of the management file is the same as the second update timing; and resume the second content item by using the resume point of the second content item in the memory, when the update timing of the management file is the same as the second update timing.

4. A storage medium storing a program that is configured to manage content items to enable data files of the content items and a management file of the content items to be read from external storage, the management file comprises information on attributes of the content items and an update timing, and the management file is updated every time one of the content items is played, the program being stored in the storage medium so that, when executed, performs a plurality of operations, comprising:

playing a first content item from the content items in the external storage;
a updating the management file at a first update timing in response to playing of the first content item;
generating a first list of the content items according to the management file;
storing the first list and the first update timing in an internal memory;
playing the first content item in the external storage again;
determining whether the update timing of the management file is the same as the first update timing;
reusing the first list of the content items in the memory, when the update timing of the management file is the same as the first update timing; and
generating a second list of the content items according to the management file, when the update timing of the management file is not the same as the first update timing.

5. The storage medium of claim 4, further comprising:
resuming playing of the first content item from the content items in the external storage;
updating the management file at a first update timing in response to resuming the play of the first content item;
generating a first list of the content items according to the management file;
storing the first list and the first update timing in an internal memory;
resuming the play of the first content item in the external storage again;
determining whether the update timing of the management file is the same as the first update timing;
reusing the first list of the content items in the internal memory, when the update timing of the management file is the same as the first update timing; and
generating a second list of the content items according to the management file, when the update timing of the management file is not the same as the first update timing.

6. The storage medium of claim 4, wherein the update information of the management file indicates whether reproduction, recording or duplication of the content has been performed in the external storage or not.

7. A method for managing content items to read, from external storage, data files of the content items and a management file of the content items, wherein the management file comprises information on attributes of the content items and an update timing, and the management file is updated every time one of the content items is played, the method comprising:

playing a first content item from the content items in the external storage;
updating the management file at a first update timing in response to playing of the first content item;
generating a first list of the content items according to the management file;
storing the first list and the first update timing in an internal memory;
playing the first content item in the external storage again;
determining whether the update timing of the management file is the same as the first update timing;
reusing the first list of the content items in the internal memory, when the update timing of the management file is the same as the first update timing; and
generating a second list of the content items according to the management file, when the update timing of the management file is not the same as the first update timing.

8. The method of claim 7, wherein the update information of the management file indicates whether reproduction, recording or duplication of the content has been performed on the external storage or not.

9. The method of claim 7, further comprising:
playing a second content item in the external storage;
stopping the playing of the second content item;
storing a resume point of the second content item in the internal memory;
updating the management file at a second update timing in response to stopping of the play of the second content item;
determining whether the update timing of the management file is the same as the second update timing; and
resuming playing of the second content item by using the resume point of the second content item in the internal memory, when the update timing of the management file is the same as the second update timing.

* * * * *